L. W. MELCHER.
ROLLER PINION.
APPLICATION FILED FEB. 16, 1918.

1,289,508.

Patented Dec. 31, 1918.

Witness:
John Enders

Inventor:
Lee W. Melcher
by Fred Gerlach
his Atty.

UNITED STATES PATENT OFFICE.

LEE W. MELCHER, OF LA CROSSE, WISCONSIN, ASSIGNOR TO LA CROSSE TRACTOR CO., OF LA CROSSE, WISCONSIN, A CORPORATION OF DELAWARE.

ROLLER-PINION.

1,289,508.

Specification of Letters Patent. Patented Dec. 31, 1918.

Application filed February 16, 1918. Serial No. 217,686.

*To all whom it may concern:*

Be it known that I, LEE W. MELCHER, a citizen of the United States, and a resident of La Crosse, in the county of La Crosse and State of Wisconsin, have invented certain new and useful Improvements in Roller-Pinions, of which the following is a full, clear, and exact description.

The invention relates to pinions provided with rollers serving as teeth for driving a sprocket wheel with semi-circular teeth.

The object of the invention is to provide a roller pinion in which both flanges and the body are integral with improved means for holding the pins on which the rollers are mounted in the flanges.

The invention consists in the several novel features hereinafter set forth and more particularly defined by claims at the conclusion hereof.

Figure 1:
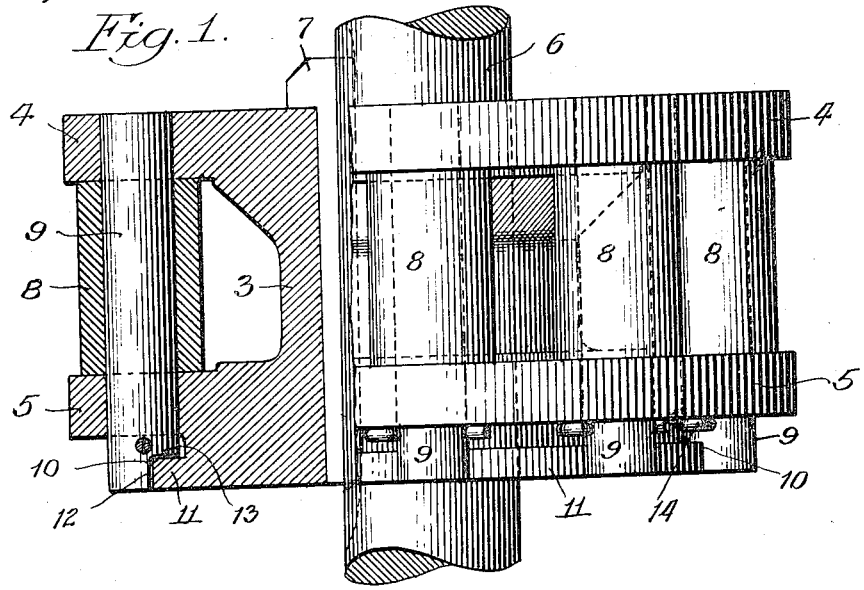
Figure 2:
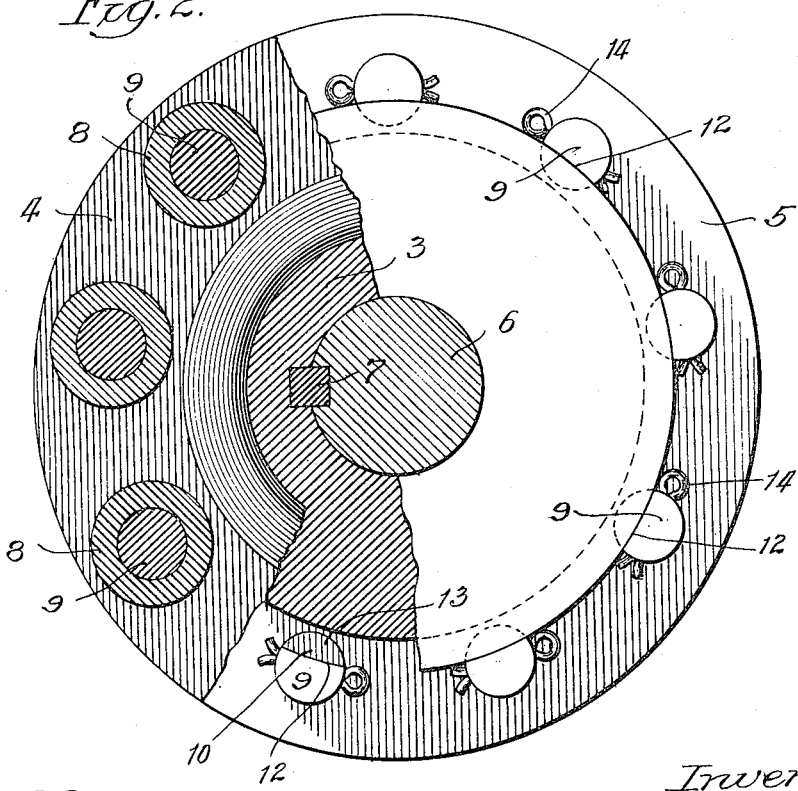

In the drawings: Figure 1 is a plan, parts being shown in section, of a pinion embodying the invention. Fig. 2 is a side elevation, parts being shown in section.

The invention is shown as applied to a pinion comprising an integral hub 3 and flanges 4 and 5, the latter being spaced apart a proper distance to admit the teeth of the co-acting sprocket wheel between them. The hub 3 is fixed on a shaft 6 by a key 7.

A series of rollers 8 are held between the flanges and are rotatably mounted on shafts 9, each of which extends through the flanges and is mounted therein. One end of each shaft 9 is extended beyond the outer face of flange 5 and is provided with a substantially right angled cut-away or recess 10, which is adapted to receive an annular flange 11, which is integrally formed with the body of the pinion. Each cut-away or recess 10 has a surface 12 conforming to and engaging the periphery of flange 11, so that the shaft 9 will be held against rotation relatively to the body of the pinion and a surface 13 which is adapted to engage the inner face of the flange 11 to prevent longitudinal movement of the shaft toward the side where the flange 11 is located. A cotter pin 14 is extended through each shaft 9 adjacent the outer side of flange 5 to hold the cotter pin against longitudinal movement in the opposite direction.

The invention exemplifies a roller pinion provided with simple and improved means for holding the shafts of the rollers against rotation and against longitudinal movement.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In a roller pinion, the combination of a body, comprising an integral hub and spaced flanges, rollers acting as gear teeth, shafts extending through said flanges and on which said rollers are mounted, said shafts having recesses or cut-aways adjacent one end, and a flange at one side of and integral with the body of the pinion and extending into said recesses.

2. In a roller pinion, the combination of a body, comprising an integral hub and spaced flanges, rollers acting as gear teeth, shafts extending through said flanges and on which said rollers are mounted, said shafts having recesses or cut-aways adjacent one end, a flange at one side of and integral with the body of the pinion and extending into said recesses, and pins extending through the shafts and adjacent the outer side of one of the flanges to hold the shafts against longitudinal movement in one direction.

LEE W. MELCHER.